(12) United States Patent
Takayasu

(10) Patent No.: US 6,500,216 B1
(45) Date of Patent: Dec. 31, 2002

(54) METHOD AND APPARATUS FOR DESALINATING SEA WATER, NATURAL SALT AND FRESH WATER

(76) Inventor: Masakatsu Takayasu, 960 Aza Taba, Gushikawa-shi, Okinawa 904-2213 (JP)

( * ) Notice: Subject to any disclaimer, the term of this patent is extended or adjusted under 35 U.S.C. 154(b) by 0 days.

(21) Appl. No.: 09/355,697
(22) PCT Filed: Feb. 16, 1998
(86) PCT No.: PCT/JP98/00651
§ 371 (c)(1),
(2), (4) Date: Jul. 30, 1999
(87) PCT Pub. No.: WO98/35911
PCT Pub. Date: Aug. 20, 1998

(30) Foreign Application Priority Data

Feb. 18, 1997 (JP) ............................................. 9-050916
Oct. 22, 1997 (JP) ............................................. 9-309392

(51) Int. Cl.⁷ ............................... C01D 3/06; C02F 1/12
(52) U.S. Cl. ........................ 23/303; 23/298; 23/302 T; 23/295 R; 203/10; 203/90; 203/48; 159/48.1; 159/45; 159/4.01; 159/4.1; 423/499.4
(58) Field of Search ................. 23/298, 303, 302 T, 23/295 R; 203/10, 90, 48; 159/48.1, 45, 4.01, 4.1; 423/499.4

(56) References Cited

U.S. PATENT DOCUMENTS

| | | | | |
|---|---|---|---|---|
| 3,904,122 A | * | 9/1975 | Schmitzer | 239/236 |
| 4,334,886 A | * | 6/1982 | Tani et al. | 23/303 |
| 4,704,189 A | * | 11/1987 | Assaf | 159/48.2 |
| 5,015,332 A | * | 5/1991 | Iwaya et al. | 159/4.2 |
| 5,139,612 A | * | 8/1992 | Andersen | 159/4.01 |
| 5,348,622 A | * | 9/1994 | Deutsch et al. | 203/10 |
| 5,527,494 A | * | 6/1996 | Weinberg et al. | 159/4.01 |
| 5,984,981 A | * | 11/1999 | Miyagi | 23/303 |

FOREIGN PATENT DOCUMENTS

WO   98/05432   *   2/1998

* cited by examiner

Primary Examiner—Ngoc-Yen Nguyen
(74) Attorney, Agent, or Firm—Muramatsu & Associates

(57) ABSTRACT

A method and an apparatus of producing natural salt or fresh water by treating sea water in an extremely short period of time and with high efficiently. The distilled water and salt components are treated for expediting crystallization of the salt components by evaporating water components by atomizing sea water and blowing warm wind thereto. During this treatment, there are provided a method and an apparatus of arranging net or cloth at one stage or a plurality of stages in a midway of a flow of the evaporated water components and adhering the salt components on the net or the cloth when the evaporated water components pass through the net or the cloth.

22 Claims, 7 Drawing Sheets

METHOD AND APPARATUS FOR DESALINATING SEA WATER, NATURAL SALT AND FRESH WATER

BACKGROUND OF THE INVENTION

1. Field of the Invention

The present invention relates to a method and apparatus for producing natural salt by treating sea water.

2. Description of Related Art

According to a currently known method of producing natural salt, a number of pieces of bamboo with branches are hung upside down in a tower formed by piling up blocks, sea water is sprinkled from thereabove and water is evaporated by wind and solar heat while flowing down on the surface of bamboo by which sea water is condensed and water is evaporated on evaporating shelves for three through seven days, thereafter, brine is moved to crystallizing shelves of a green house type and salt is crystallized. Successively, the brine is separated into salt and bittern. According to the salt production process, there is provided an advantage in which compared with a process of boiling it in a kettle, various rare substances are not changed in respect of the qualities or vanished by intense heat.

Meanwhile, as a process of producing drinking water artificially from sea water, there has been known a desalination apparatus by a reverse osmosis membrane process which is used in a district having a small amount of rainfall or a district having a small number of dams.

According to the salt producing process mentioned above, salt component is crystallized over a number of days and therefore, the efficiency is poor and the process is not suitable for mass production. As a result, expensive natural salt is brought about.

Further, according to the process of producing fresh water from sea water by the reverse osmosis membrane process, a very complicated and high degree of technology is required and the installation cost becomes high. Further, the efficiency is poor and the process is not suitable for mass production of fresh water.

It is the technological problem of the invention to realize a treating method and a treating apparatus of sea water capable of producing natural salt with no need of an expensive equipment, in an extremely short period of time and efficiently by paying attention to such problems.

SUMMARY OF THE INVENTION

The technical problem of the invention is revolved by the following means.

Invention according to a first through a seventh aspect relates to a method of treating sea water for producing salt by means of atomizing sea water by rotating a centrifugal generator and of evaporating a water component to crystallize the salt by blowing warm wind thereto, wherein between a treating chamber and an outflow portion for the evaporated water component there is arranged at least one of net and cloth in one stage or a plurality of stages, the salt component is adhered to at least one of the net and the cloth when the evaporated water component passes through at least one of the net and the cloth, and thereafter the adhered salt component is peeled and dropped from at least one of the net and cloth.

When the net and the cloth are respectively used in a plurality of stages, the respective nets and cloths may be directly overlapped or may be spaced with an interval being kept therebetween. Further, also when both the net and the cloth are used, they may be mutually overlapped or may be spaced. In this case, either may be laid above.

When sea water is atomized in this way, innumerable small particles of sea water are composed and therefore, the surface area in contrast to the volume becomes large and vaporization of the water component is facilitated. As a result, vaporization of the water component from the salt crystal can efficiently be carried out. Further, warm wind is blown thereto and therefore, vaporization of the water component is expedited by thermal energy and wind and natural salt can inexpensively be produced. Further, sea water is brought into very fine mist and therefore, natural salt having very fine particles can be provided. Distilled water can be recovered and utilized as fresh water. Accordingly, at least one or both of fresh water and salt can be produced.

Particularly, between the treating chamber and the outflow portion of the evaporating water component there is arranged at least one of net (first screen) and cloth (second screen) is arranged in one stage or a plurality of stages and accordingly, when the evaporated component passes through at least one of the net and the cloth, the salt component is prevented from passing therethrough and is adhered to at least one of the net and the cloth. Here, within the context of the present invention, the phrase of "at least one of net and cloth" is used to mean either (1) net, (2) cloth, or (3) net and cloth. The cloth (second screen) has a mesh size smaller than that of the net (first screen).

As a result, it is possible to prevent the salt component separated from the water component and the condensed sea water from being discharged wastefully. Further, the salt component and the condensed sea water are hampered by at least one of the net and the cloth to suppress discharges therefrom. Therefore, an amount of the salt component contained in the discharged water component is reduced and accordingly, water obtained becomes more resembled to fresh water.

And, since the salt component adhered to the net and the cloth is peeled and dropped therefrom, only the salt component is efficiently recovered and mass-production of salt becomes possible.

According to the second aspect of the invention, there is provided a method of treating sea water according to the first aspect, wherein at least one of the net and the cloth is made to hang on a side portion of the treating chamber and the salt component is adhered thereto.

In this way, according to the method wherein at least one of the net and the cloth is made to hang also on a side portion of the treating chamber and the salt component is adhered thereto, also the salt component floating in the vicinity of a side wall of the treating chamber is adhered to the net and the cloth, so that salt is produced more efficiently by peeling and dropping the adhered salt component.

According to the third aspect, there is provided the method of treating sea water according to the first or second aspect, wherein a number of strings are made to hang on a lower side of at least one of the net and the cloth and the salt component is adhered to the number of strings. In this way, when a number of strings are made to hang below the net or the cloth for preventing the salt component from passing through without stopping and the salt component is adhered thereto, salt crystal can be provided before reaching the net or the cloth and by knocking or shaking the number of strings or knocking or shaking them after collecting them to one place, the salt component can easily be collected to one place.

According to the fourth aspect, there is provided the method of treating sea water according to the second aspect or the third aspect, wherein the salt component adhered to at least one of the net and the cloth is recovered by washing off the salt component by sea water or by other method. Further, in respect of a method of separating the salt component adhered onto at least one of the net and the cloth from the net or the cloth, there can be provided a method of knocking, shaking it down by applying vibration other than a method of washing it off by sea water.

In this way, when the salt component or the condensed sea water adhered to the net or the cloth by being prevented from passing therethrough can be recovered in the treating chamber when it is washed off or shaken off by spraying sea water and accordingly, the salt component separated from the water component or the condensed sea water can be utilized for salt production and salt production can be carried out efficiently.

According to the fifth aspect of the invention, there is provided a method of treating sea water according to any one of the first through the fourth aspects, wherein the atomization of the sea water is carried out by means of applying a centrifugal force to the sea water by rotating an impeller in which arcuate blades are radially provided in a space between two circular disks and which has a water injection port at its center.

In mass production of fresh water or natural salt, sea water needs to convert into small particles in a large amount such that small particles thereof as fine as possible are produced and according to a method of producing a mist by a centrifugal force produced by an impeller in which arcuate blades are radially provided in a space between two circular disks and which has a water injection port at its center as proposed by inventors of the invention in Japanese Patent Application No. 8-297129 and Japanese Patent Application No. 8-220618, a large amount of sea water can easily be finely atomized and a large amount of salt or fresh water can be produced.

According to the sixth aspect of the invention, there is provided a method of treating sea water in accordance with any one of the first through the fifth aspects, wherein sea water is atomized by scattering sea water in a treating chamber, warm wind is blown thereto, an evaporated water component is discharged to outside of the treating chamber and a crystallized salt component is stored in the treating chamber. In this way, by adopting the method of atomizing sea water and blowing warm wind thereto in a space of the treating chamber and discharging the evaporated water component to outside of the treating chamber, a large amount of fresh water and natural salt can be separated and therefore, mass production of natural salt or fresh water can easily be carried out. As a result, natural salt and fresh water can be supplied inexpensively.

According to the seventh aspect of the invention, there is provided the method of treating sea water according to any one of the first through the sixth aspects, wherein the sea water is atomized after preheating the sea water at a temperature to a degree by which components in the sea water are not altered. In this way, since the thermal energy is applied on sea water by preheating it when the sea water is made fine and scattered, vaporization of sea water and crystallization of natural salt are further expedited. In this case, sea water is heated at a temperature to a degree by which components in sea water are not altered and accordingly, quality of natural salt is not deteriorated.

Accordingly, when the fan 34 is rotated in a state in which the heat generating body 31 of, for example, a heater is operated, air sucked by the fan 34 is heated by the heat generating body 31, blown into the treating chamber 1 and also blown to the heating chamber 25. As a result, vaporization of fine particles of sea water in the treating chamber 1 is expedited and heating of air in the heating chamber 25 is expedited. Further, the heating achieves power particularly when the weather is deteriorated and solar energy cannot be expected.

An eighth aspect through a twenty-second aspect of the invention relate to an apparatus of treating sea water. According to the eighth aspect, there is provided an apparatus of treating sea water for producing salt by means of atomizing sea water by rotating a centrifugal generator and of evaporating a water component to crystallize the salt by blowing warm wind thereto wherein between a treating chamber and an outflow portion for the evaporated water component there is arranged at least one of net and cloth in one stage or a plurality of stages, and there is provided means for peeling and dropping the salt component adhered to at least one of the net and the cloth from at least one of the net and the cloth.

In this way, one stage or plural stages of at least one of the net and the cloth for preventing the salt component from escaping are arranged between the treating chamber and the outflow portion for the evaporated water component and accordingly, in producing salt by treating sea water, the salt component or the condensed sea water is hampered by the net or the cloth and the discharge is restrained and therefore, only the water component passes through the net or the cloth and is discharged.

And, there is provided means for peeling and dropping the salt component adhered to the net and the cloth and accordingly, the salt component and the condensed sea water can be separated more effectively from the water component to produce salt in mass-production basis, and the water component can be utilized as flesh water.

Different from the net, the cloth is not provided with gaps (meshes) and therefore, the salt component can effectively be prevented from passing therethrough without stopping, however, it is also effective to use the cloth along with the net. However, considerable effect is achieved even only with a net. In the case of installing plural stages of the net, when the respectives of net are constituted to directly overlap each other, the meshes are substantially made fine and the salt component or the condensed sea water can firmly be adhered thereto and recovered. Further, when they are installed at intervals, the salt component or the condensed sea water passes through the respectives of the net at plural times and the salt component or the condensed sea water can be adhered and recovered further effectively.

According to the ninth aspect of the invention, there is provided the apparatus of treating sea water according to the eighth aspect, wherein a number of strings are made to hang on a lower side of at least one of the net and the cloth for adhering the salt component. In this way, when a number of strings are made to hang below the net or the cloth for preventing the salt component from passing therethrough without stopping, before the salt component reaches the net or the cloth, the floating salt component is adhered to the large number of strings and accordingly, recovery of the salt component is facilitated which is suitable for mass production.

According to the tenth aspect of the invention, there is provided the apparatus of treating sea water according to the eighth aspect or the ninth aspect, wherein means for washing off the salt component by spraying the sea water at least on one of the net and the cloth is arranged on an upper side of at least one of the net and the cloth.

In this way, owing to the structure in which the salt component or the condensed sea water adhered to the net or the cloth is washed off by scattering sea water to the net or the cloth, the salt component or the condensed sea water adhered to the net or the cloth can be recovered and utilized in salt production. As a result, the salt component or the condensed sea water can be prevented from wastefully discharging and the yield of salt production is promoted.

According to the eleventh aspect of the invention, there is provided an apparatus of treating sea water comprising means for atomizing and scattering sea water into a treating chamber and warm wind blowing means for blowing warm wind to mist of the sprayed sea water, wherein a duct hole for exhausting vapor produced by being vaporized in a treating chamber to outside of the treating chamber is provided at a roof portion of the treating chamber. The roof portion of the treating chamber indicates a wall portion closing an upper portion of the treating chamber. The warm wind blowing means includes a structure in which the atomizing means serves also as the warm wind blowing means by supplying warm air to an intake side of the scattering means and means exclusive for blowing warm wind installed separately from the scattering means.

And, net is provided so as to cover the duct hole, and means for peeling and dropping the salt component adhered to the net is provided.

In this way, means for atomizing and scattering sea water in the treating chamber is provided and therefore, sea water can be atomized in the treating chamber and can be scattered into a wide space such that vaporization of the water component is facilitated. Further, the warm wind blowing means is provided and therefore, thermal energy and wind can be applied to small particles of sea water. Vaporized vapor rises since its specific weight is light and the duct hole for exhausting is opened at the roof portion of the treating chamber and accordingly, only the water component can smoothly be discharged from the treating chamber and can be separated from crystals of natural salt.

Further, the net is provided so as to cover the duct of the roof portion for discharging the water vapor vaporized in the treating chamber, and means for peeling and dropping the salt component adhered to the net is provided and accordingly, it is possible to peel and drop the salt component adhered to the net and the condensed sea water by such means as washing off with the sea water, so that it is suitable for efficiently producing salt in mass-production basis.

According to the twelfth aspect of the invention, there is provided the apparatus of treating sea water according to the eleventh aspect, wherein at least one stage of at least one of a net and a cloth for adhering a salt component is arranged at a midway or on a lower side of the duct hole and means for washing off a salt component by scattering the sea water to at least one of the net and the cloth is arranged on an upper side of at least one of the net and the cloth.

In this way, owing to the constitution in which the net or the cloth for adhering the salt component is arranged in a midway or on a lower side of the duct hole opened between inside of the treating chamber and outside of the treating chamber, the net or the cloth having a comparatively small area is sufficient and means for washing off the salt component or the condensed sea water adhered to the net or the cloth is sufficient with a small scale. Further, all the salt component or the condensed sea water discharged from inside of the treating chamber to outside thereof passes through the duct hole and accordingly, the salt component or the condensed sea water can efficiently be recovered.

According to the thirteenth aspect of the invention, there is provided the apparatus of treating sea water according to the eleventh or the twelfth aspect, wherein an outer roof is provided above a roof portion of the treating chamber and an outer wall is provided at outside of side walls of the treating chamber, wherein means for scattering the sea water is provided above the outer roof, and wherein a water distributing constitution in which the sea water recovered from above the outer, roof is supplied to the atomizing means is constituted. Sea water recovered from above the outer roof is not necessarily be supplied directly to the atomizing means. Accordingly, the aspect includes also a case in which sea water is supplied to the atomizing means via a preheating unit.

In this way, sea water is scattered on the outer roof, the water component is evaporated by solar ray and wind and concentration of the salt component is increased and thereafter, sea water is supplied to the atomizing means and fine mist of sea water is produced in the treating chamber and therefore, separation of the water component from the salt component can efficiently be carried out. Further, by scattering sea water on the upper roof and cooling a space between the outer roof and the roof of the treating chamber, vapor which has been vaporized in the treating chamber and flows in the space is cooled and condensed and accordingly, the space constitutes negative pressure. As a result, an effect of sucking smoothly vapor in the treating chamber into the space can also be achieved.

Further, when vapor is cooled and liquefied to constitute liquid, thermal energy absorbed in the treating chamber as vaporization heat is discharged as liquefaction heat. The discharged heat can expedite condensation by warming sea water scattered on the outer roof and can contribute to vaporization of small particles of sea water by being transferred also into the treating chamber.

According to the fourteenth aspect of the invention, there is provided the apparatus of treating sea water according to the eleventh, the twelfth or the thirteenth aspect, wherein at least one stage of at least one of the net and the cloth for adhering the salt component is arranged at least one of a lower side of the roof portion of the treating chamber (inner roof) and inner sides of the side walls.

In this way, owing to the constitution in which the net or the cloth for adhering the salt component is arranged on the lower side of the inner roof of the treating chamber or on the inner sides of the side walls, the net or the cloth can be stretched in a wide region and the salt component or the condensed sea water can be caught in a wide area and accordingly, the efficiency of recovering the salt component or the condensed sea water is increased.

According to the fifteenth aspect of the invention, there is provided the apparatus of treating sea water according to the fourteenth aspect, wherein a number of strings are made to hang from a lower side of at least one of the net and the cloth for adhering the salt component. In this way, in the inside of the treating chamber, owing to the constitution in which the number of strings are made to hang below the net or the cloth for preventing the salt component from passing therethrough without stopping, the salt component adheres to the number of strings before reaching the net or the cloth and accordingly, the salt component adhered to the strings can be shaken off and recovery of the salt component is facilitated which is suitable for mass production.

According to the sixteenth aspect of the invention, there is provided the apparatus of treating sea water according to the fourteenth or the fifteenth aspect, wherein means for washing off the salt component by scattering the sea water to at least one of the net and the cloth is arranged on an upper side of at least one of the net and the cloth on the lower side of the roof portion of the treating chamber. In this way, owing to the constitution in which sea water is scattered from the upper side of the net on the lower side of the inner roof to thereby wash off the salt component, a large amount of the salt component or the condensed sea water adhered to the net or the cloth in a wide region can efficiently be recovered and utilized in salt production.

According to the seventeenth aspect of the invention, there is provided the apparatus of treating sea water according to any one of the eleventh through the sixteenth aspects, further comprising a preheating unit for heating the sea water supplied to the means for atomizing the sea water at a temperature to a degree by which components in the sea water are not altered.

In this way, before supplying sea water to the atomizing means, owing to the preheating unit of sea water, sea water accompanied by thermal energy is supplied to the atomizing means and therefore, vaporization of water component of mist of sea water is further expedited.

According to the eighteenth aspect of the invention, there is provided the apparatus of treating sea water according to any one of the eleventh through the seventeenth aspects, wherein a heating chamber is installed at a distance from the side wall of the treating chamber, wherein the sea water preheating means is installed in the heating chamber, and wherein heated air in the heating chamber is blown by blowing means from an opening opened at the side wall into the treating chamber. The blowing means includes exclusive blowing means and blowing means provided to the mist scattering device.

In this way, the heating chamber is installed at a distance from the side wall of the treating chamber and warm wind in the heating chamber is blown to inside of the treating chamber and accordingly, a large amount of thermal energy can be provided to fine mist of sea water in the treating chamber and vaporization of the water component is further expedited. Further, the preheating unit of sea water according to the seventeenth aspect is installed in the heating chamber and extra heat produced from the sea water preheating unit is utilized which is economical.

According to the nineteenth aspect of the invention, there is provided the apparatus of treating sea water according to any one of the eleventh through the eighteenth aspects, further comprising a heating facility for supplying warm air into the treating chamber. In this way, owing to the constitution capable of supplying warm air produced in the heating facility into the treating chamber, even when solar energy cannot be utilized as in, for example, rainy weather, thermal energy is provided to small particles of sea water in the treating chamber and the water component and the salt component can smoothly be separated from each other.

According to the twentieth aspect of the invention, there is provided the apparatus of treating sea water according to any one of the thirteenth through the nineteenth aspects, wherein a water distributing structure capable of supplying the sea water to the preheating unit without via the outer roof is constituted. When the processing of condensing sea water by natural energy on the outer roof cannot be carried out owing to rainy weather, the sea water is supplied as it is to the preheating unit, and can be supplied into the treating chamber after being provided with thermal energy and accordingly, natural salt and fresh water can be produced without being controlled by weather.

According to the twenty-first aspect of the invention, there is provided the apparatus of treating sea water according to any one of the thirteenth through the twentieth aspects, wherein a water distributing structure for scattering the sea water in a sea water tank for storing sea water by recovering the sea water scattered on the outer roof, guiding and scattering the sea water again onto the outer roof is constituted. In this way, owing to the structure in which sea water the salt component of which is condensed by scattering the sea water on the outer roof, is guided and scattered again on the outer roof, the sea water can be condensed by natural energy on the upper roof over a plurality of times. Therefore, it is suitable for the case of mass production of natural salt.

According to the twenty-second aspect of the invention, there is provided the apparatus of treating sea water according to any one of the thirteenth through the twenty-first aspects, wherein at least the roof of the treating chamber and the outer roof comprise transparent bodies. In this way, by constituting the outer roof and the roof of the treating chamber by transparent bodies, solar energy can reach the inside of the treating chamber to thereby heat it and accordingly, in fair weather, vaporization of fine mist of sea water in the treating chamber can efficiently be carried out.

In this way, according to salt or condensed sea water including salt provided by the invention, by removing bittern by reducing the water component, only crystals of salt can be separated.

DETAILED DESCRIPTION OF PREFERRED EMBODIMENTS

Figure 1:
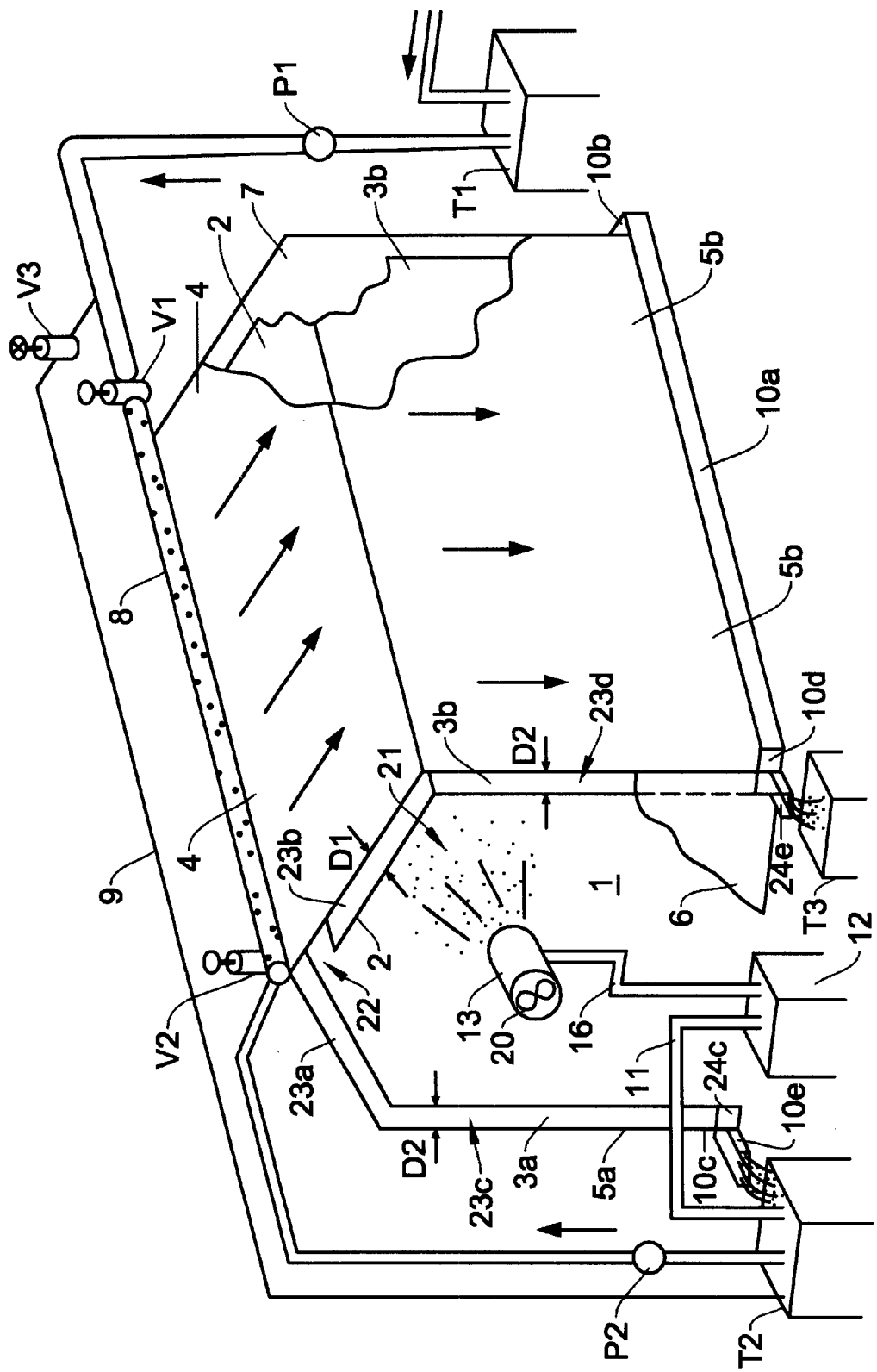
FIG. 1 is a perspective view showing a total configuration of a sea water treating apparatus according to the invention.
Figure 2:
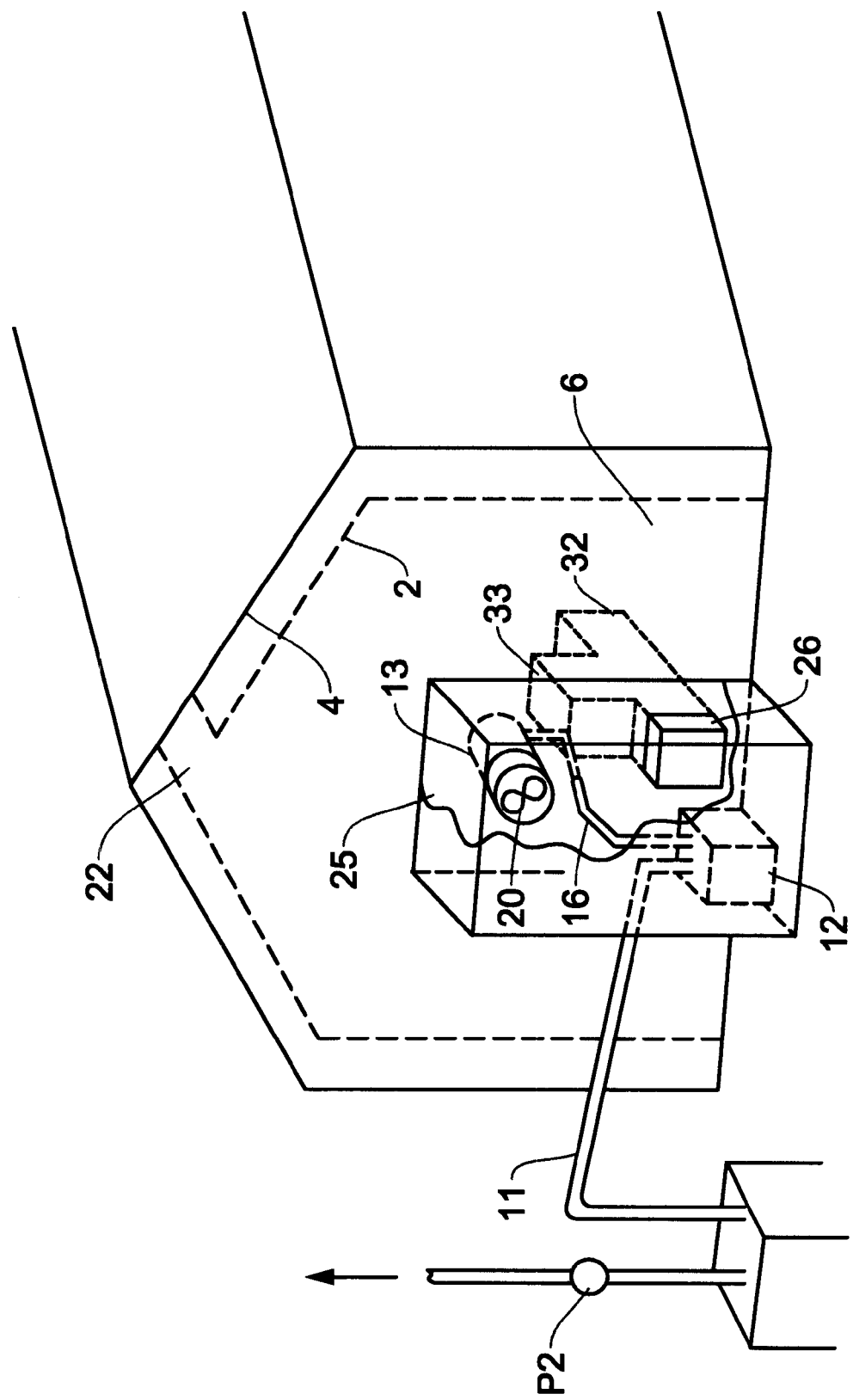
FIG. 2 is a perspective view exemplifying a vicinity of a heating unit.

Next, an explanation will be given of embodiments showing how a treating method and a treating apparatus of sea water according to the invention are actually embodied. FIG. 1 is a perspective view showing a total configuration of a sea water treating apparatus according to the invention and FIG. 2 is a perspective view exemplifying a heating unit.

Numeral 1 designates a treating chamber for treating sea water and in the illustrated example, the chamber is surrounded by a roof 2 in a shape of a gable roof and side walls 3a and 3b on both sides. Further, an outer roof 4 in a shape of a gable roof is installed above the roof 2 of the treating chamber interposing an interval D1 therebetween and outer walls 5a and 5b are installed on outer sides of the side walls 3a and 3b of the treating chamber by interposing an interval D2 therebetween. Both ends of the treating chamber 1 and both ends, that is, gable sides of space portions 23a, 23b, 23c and 23d of the intervals D1 and D2, are enclosed by gable walls 6 and 7.

A sprinkling pipe 8 perforated with a number of holes at its side wall is installed as sprinkling means above a ridge portion of the outer roof 4 and one end of the sprinkling pipe 8 is connected to a sea water storage tank T1 via an opening/closing valve V1 and a pump P1. Further, other end of the sprinkling pipe 8 is connected to a sea water storage tank T2 via an opening/closing valve V2 and a pump P2. A straight water pipe 9 is extended from an intermediary between the first pump P1 and the first opening/closing valve V1 to the tank T2 via an opening/closing valve V3. Further, sear water is pumped up from sea to the first tank T1 and is normally stored there.

Figure 3:
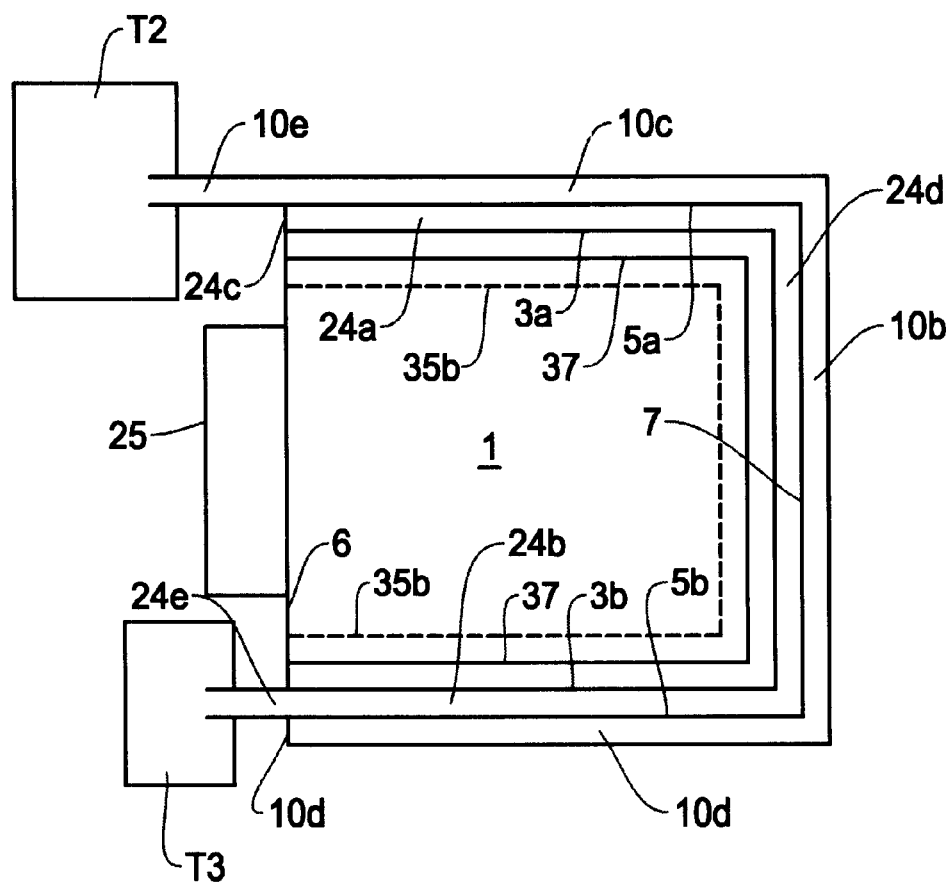
FIG. 3 is a plane view horizontally cutting side walls and outer walls of a treating chamber.

FIG. 3 is a plane view viewing the treating chamber 1 and the side walls 3a, 3b, 5a and 5b from above by horizontally cutting them. Sea water sprinkled by the sprinkling pipe 8 flows down on the outer roof 4 and the outer walls 5a and 5b. In order to recover the flowed-down sea water, recovering grooves 10a, 10b and 10c surround the outer wall 5a, the gable wall 7 and the outer wall 5b, an upstream end 10d of the recovering groove 10a is closed and a guide groove 10e is extended from a downstream end of the recovering groove 10c to the second tank T2.

Sea water stored in the second tank T2 is delivered to a preheating unit 12 by a pipe 11 and is supplied to atomizing means 13 in a heated state.

As the atomizing means 13, invention disclosed in Japanese Patent Application No. 8-297129 proposed by the inventors of the invention can be utilized. For example, as shown by FIG. 8(1), a number of holes are perforated at a peripheral wall of a circular cylinder 14, a net 15 having fine mesh is arranged on its outer side and the cylinder 14 and the net 15 are rotated together while supplying sea water into the circular cylinder 14 by a pipe 16, sea water scattered from the net 15 by a centrifugal force is brought into a finely atomized state.

Figure 8:
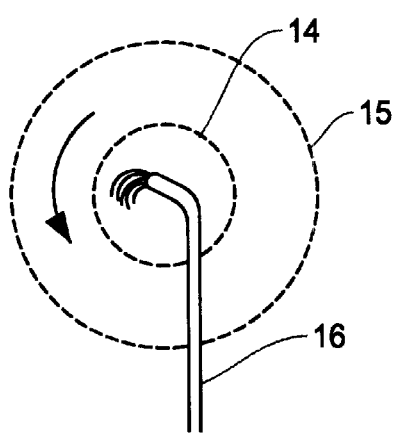
FIGS. 8(1) and 8(2) are views showing various embodiments of atomizing means.
Figure 8:
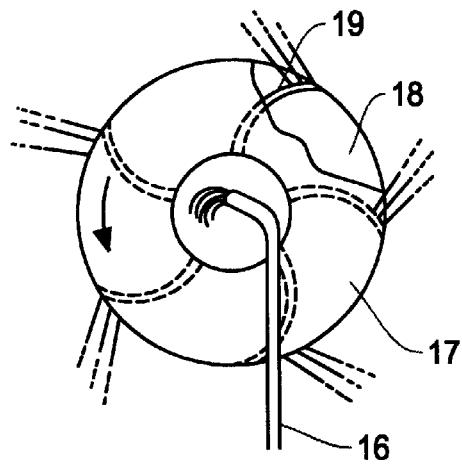

Further, as shown by FIG. 8(2), when blades 19 in a circular arc shape are installed radially between two sheets of circular disks 17 and 18 and rotated while supplying sea water to a central hole by the pipe 16, sea water is scattered by the blades 19 by the centrifugal force and an atomized state is produced. Although such an atomizing means is sufficient, by further installing a blowing fan 20 in parallel therewith, fine mist can be sprayed to the center of the treating chamber 1.

Various structure of atomizing means by centrifugal force and various combinations of atomizing means and blowing means are disclosed in Japanese Patent Application No. 8-297129 and Japanese Patent Application No. 8-220618 and these can be utilized also in the invention.

Other than these means, by utilizing, for example, an ultrasonic vibrator, fine mist of sea water can be produced.

Fine mist 21 in the treating chamber 1 shown by FIG. 1 is heated to about 40 through 60° C. by the preheating unit 12 and accordingly, the water component is vaporized in the treating chamber 1 and flows out from an opening 22 on the gable side of the roof 2 into the spaces 23a and 23b having the interval of D1. Successively, the fine mist 21 is liquefied by being cooled by sea water on the outer roof 4 and converted into fresh water which flows down toward the spaces 23c and 23d having the interval D2 on the sides of the side walls.

In order to recover the fresh water, fresh water recovering grooves 24a and 24b are installed on the lower sides of an intermediary between the side walls 3a and 5a and an intermediary between the side walls 3b and 5b and an end portion 24c on the upstream side of the recovering groove 24a is closed. Right ends of the recovering grooves 24a and 24b are connected by a pipe 24d and a guide groove 24e is extended from a downstream portion of the recovering groove 24b to the fresh water tank T3.

In order to make efficient the processing of finely atomizing sea water in the treating chamber 1, a heating chamber 25 shown by FIG. 2 is installed. The heating chamber 25 is constituted by a chamber in a box-like shape on an outer wall of the gable wall 6 of the treating chamber 1 and the preheating unit 12 is arranged at inside thereof. Further, an opening is provided on the gable wall 6 to thereby communicate the heating chamber 25 with the treating chamber 1 and the opening is inserted with the atomizing means 13 of the blowing type.

Figure 4:
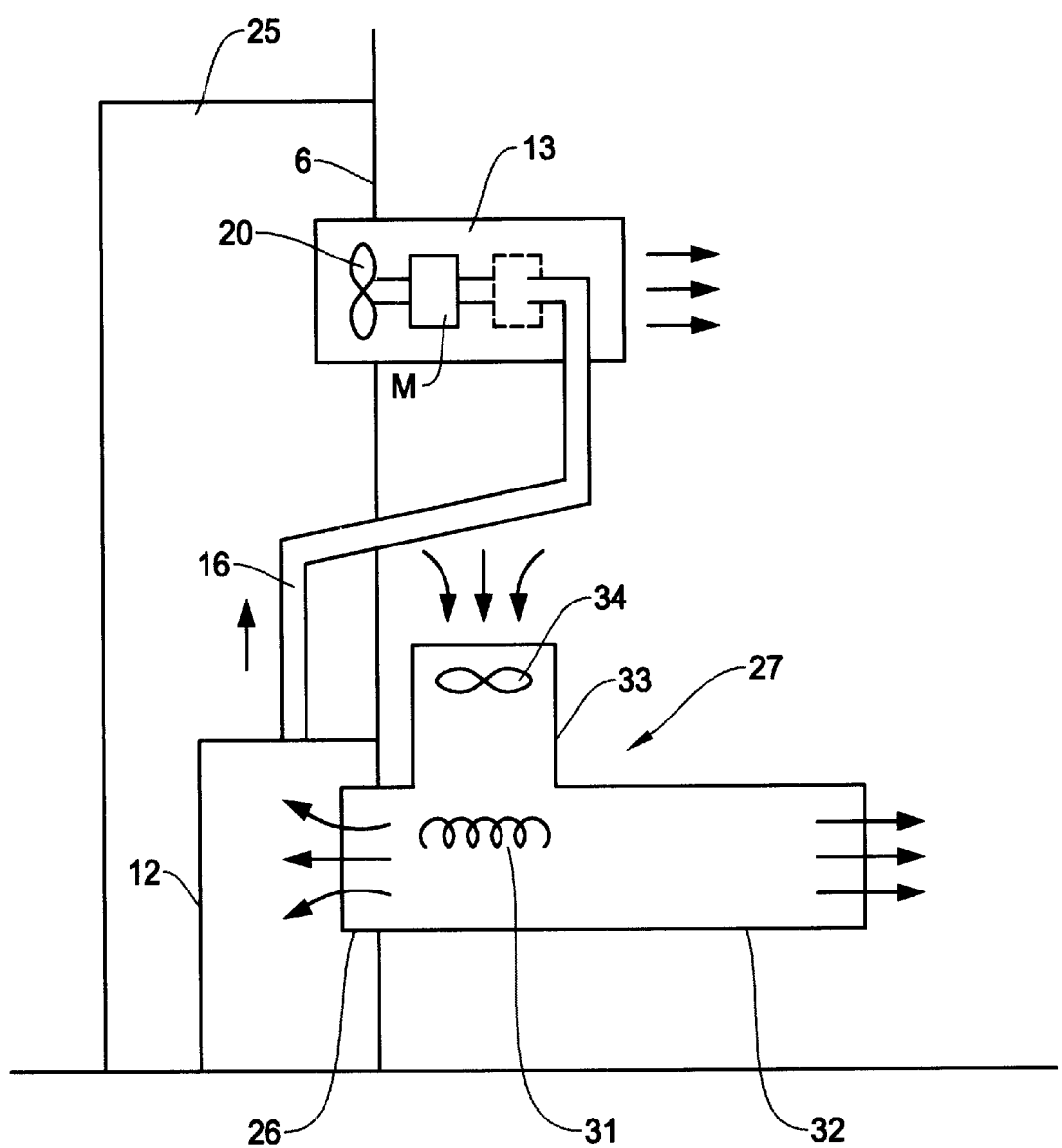
FIG. 4 is a longitudinal sectional view exemplifying a vicinity of a heater.

An opening is provided also on the lower side of the atomizing means 13 and the opening is inserted with a cylindrical body 26. FIG. 4 is a sectional view showing the portion of the cylindrical body 26, a heater 27 is installed on the inner side of the gable wall 6, a heat generating body 31 is built in an intersection portion of pipes in an inverse T-like shape, the cylindrical body 26 on one side is opened to the heating chamber 25 and a cylindrical body 32 on the other side is opened to the treating chamber 1. Further, a fan 34 for sucking is built in a cylindrical body 33 on the upper side of the heat generating body 31.

Accordingly, when the fan 34 is rotated in a state in which the heat generating body 31 of, for example, a heater is operated, air sucked by the fan 34 is heated by the heat generating body 31, blown into the treating chamber 1 and also blown to the heating chamber 25. As a result, vaporization of fine particles of sea water in the treating chamber 1 is expedited and heating of air in the heating chamber 25 is expedited. Further, heating of air in the heating chamber 25 is expedited. Further, the heating achieves power particularly when the weather is deteriorated and solar energy cannot be expected.

The heater 27 needs not to install right under the atomizing means 13 and may be installed to(shift) therefrom. Further, although in the illustrated example, the heater 27 is installed in the treating chamber 1 to suck air in the treating chamber 1, it can be installed in the heating chamber 25 to suck air in the heating chamber 25. Further, there can be constructed a structure in which the heater 27 is installed outside of the outer wall 5a or 5b or the gable wall 6 or 7, sucks outer air to heat it and warm air is supplied to the treating chamber 1 or the heating chamber 25. The heat source is not limited to electricity but can be provided by combusting heavy oil.

The preheating unit 12 is a device for heating sea water in a vessel at about 40 through 60° C. to a degree by which minerals in sea water are not altered and side walls of the preheating unit 12 emits extra heat to thereby heat the inside of the heating chamber 25.

Heated sea water is supplied to the atomizing means 13 of a blowing type by a pipe 16. When the fan 20 of the atomizing means 13 of a blowing type is rotated, warm air in the heating chamber 25 is blown into the treating chamber 1 and therefore, evaporation of moisture in fine mist of sea water is further expedited. Further, salt component and minerals remaining after vaporizing moisture are crystallized to pile up or to be stored at inside of the treating chamber 1.

Further, warm wind is supplied into the treating chamber 1 also from the cylindrical body 32 of the heater 27 installed on the lower side of the atomizing means 13 of a blowing type and accordingly, the inside of the treating chamber 1 is heated to about 40 through 60° C. to a degree by which substances in sea water are not altered. As a result, vaporization and crystallization of sea water in the treating chamber is carried out smoothly.

In this way, it is preferable that the inside of the treating chamber 1 is heated and therefore, each of the outer roof 4 and the roof 2 of the treating chamber is suitable to be constituted by a transparent body, for example, transparent synthetic resin plate or sheet such that heat of solar ray can also be utilized in fair weather. Further, the respective side walls are preferably constituted by material of light transmitting performance.

Next, an explanation will be given of a method of treating sea water and producing natural salt and fresh water by the illustrated apparatus. First, in FIG. 1, when the pump P1 is started in a state in which sea water is normally stored in the sea water tank T1, only the opening/closing valve V1 is opened and other opening/closing valves V2 and V3 are closed, sea water scooped up from the sea water tank T1 is sprinkled from the sprinkling pipe 8 on the outer roof 4 and successively flows down to the recovering grooves 10c and 10a via the side walls 5a and 5b. During the time period, the water component is evaporated by solar heat or natural wind and salt concentration of sea water is increased.

Further, sea water flows in an order of the recovering grooves 10a→10b→10c→guide groove 10e and is stored in the condensed sea water tank T2. Sea water condensed in this way is transmitted from the tank T2 to the preheating unit 12 by the pipe 11 and is supplied to the atomizing means 13 by the pipe 16 in a state in which sea water is accompanied by thermal energy by being heated to about 40 through 60° C. Sea water is atomized by a centrifugal force by the atomizing means 13 and is scattered to a wide space in the treating chamber 1 by a wind force by the fan 20.

As a result, respective small particles of sea water which have been made fine are brought into a state in which the surface area is large in contrast to the volume and accordingly, the water component is easily vaporized and evaporated and the water component flows out of the treating chamber 1 from the opening 22 on the upper side. By sprinkling sea water on the outer roof 4, the spaces 23a and 23b on the lower side of the outer roof 4 are cooled and therefore, vapor which flows out from the opening 22 is cooled at the spaces 23a and 23b to thereby constitute distilled water which flows down via the side walls 3a and 3b of the treating chamber, flows in an order of the recovering grooves 24a, 24d and 24b and the guide groove 24e and is stored in the fresh water tank T3 as fresh water.

As mentioned above, when vapor which flows into the spaces 23a and 23b of the interval D1 is liquefied by being cooled by sea water on the outer roof 4, the spaces 23a and 23b constitute negative pressure and therefore, vapor in the treating chamber 1 is smoothly sucked into the spaces 23a and 23b and separation from salt component is carried out smoothly.

Salt component and minerals which remain in the treating chamber 1 by vaporizing the water component, are crystallized and piled up in the treating chamber 1. Therefore, natural salt including a large amount of mineral components such as bittern is produced.

Sea water supplied to the atomizing means 13 is heated in the preheating unit 12 and therefore, vaporization of the water component in the treating chamber 1 can easily be carried out. Further, as shown by FIG. 2, the heating chamber 25 is provided and air heated by extra heat produced from the preheating unit 12 is blown into the treating chamber 1 by the fan 20 and accordingly, vaporization of fine mist of sea water in the treating chamber is expedited also by the warm wind. Further, warm wind is blown into the treating chamber 1 also by the heater 27 on the lower side of the atomizing means 13 and therefore, vaporization of sea water is expedited also by the warm wind. In this way, by producing a large amount of fine mist by making sea water fine and adding thermal energy supplied into the treating chamber 1 and the wind, sea water is efficiently vaporized, the water component is recovered as fresh water and remaining salt component is utilized as natural salt.

Condensation of salt component by sprinkling sea water on the outer roof 4 may be carried out twice or more. That is, when the second pump P2 is started in a state in which the first opening/closing valve V1 is closed and the second opening/closing valve V2 is opened, sea water in the condensed sea water tank T2 is supplied to the sprinkling pipe 8 and is again sprinkled on the outer roof 4.

Further, by pumping up sea water which is recovered by the route of the recovering grooves 10a→10b→10c→guide groove 10e again to the sprinkling pipe 8, and repeatedly sprinkling sea water on the outer roof 4, sea water having high salt concentration is produced. As a result, production of natural salt by vaporizing water in the treating chamber 1 is made further efficient.

In the case in which sea water cannot be sprinkled on the outer roof 4 as in rainy weather, when the first opening/closing valve V1 is closed, the third opening/closing valve V3 is opened and the first pump P1 is started, sea water is stored straight to the condensed sea water tank T2 by the pipe 9 and is successively supplied to the preheating unit 12.

Next, an explanation will be given of other embodiments in respect of a surrounding around the outer roof 4 and the roof of the treating chamber 1 in reference to FIGS. 5(1), 5(2) and 5(3). Although the constitution of FIG. 5(1) is basically the same as the embodiment illustrated by FIG. 1 and FIG. 2, guides 28 in a semi-circular cylinder shape are installed such that sea water sprinkled on the outer roof 4 is prevented from flowing on the outer sides of the side walls 5a and 5b by inertia as shown by arrow marks, sea water which has flowed from above the outer roof 4 is turned to the sides of the side walls 5a and 5b by which sea water flows down along the side walls 5a and 5b and enters the recovering grooves 10c and 10a.

Figure 5:
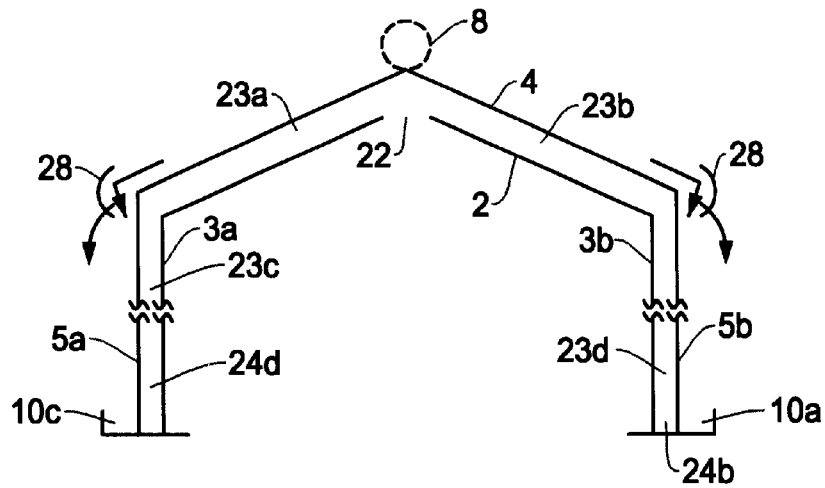
FIGS. 5(1), 5(2) and 5(3) are sectional views showing various embodiments of a vicinity of a roof of the treating chamber and an outer roof.
Figure 5:
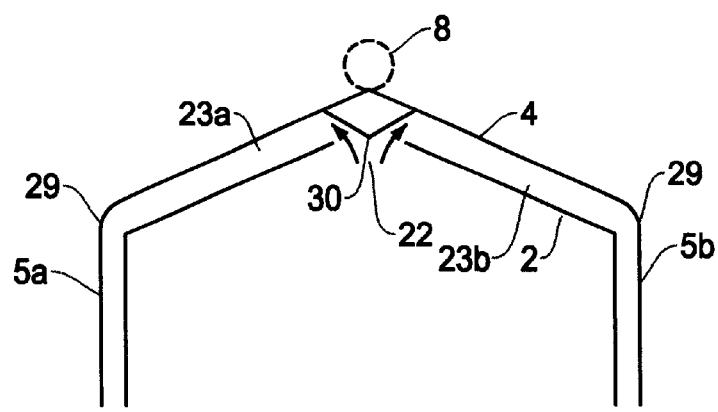
Figure 5:
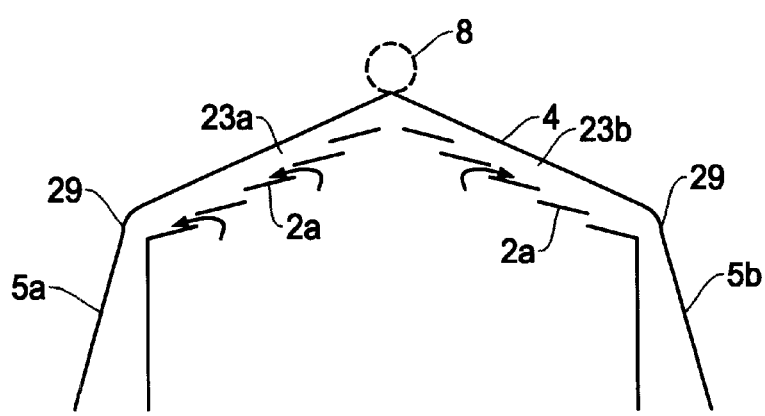

According to the constitution of FIG. 5(2), the guides 28 in a semi-circular cylinder shape are not installed but curved faces 29 are constituted between the outer roof 4 and the side walls 5a and 5b by which sea water which has flowed down from the outer roof 4 is guided by the side walls 5a and 5b along the curved faces 29. Further, a vapor guide 30 in a V-like shape is installed right under the ridge portion of the outer roof 4 and vapor rising from the opening 22 installed at the ridge portion of the roof 2 of the treating chamber is guided by the vapor guide 30 to smoothly move into the spaces 23a and 23b of the interval D1 as shown by arrow marks.

According to the constitution of FIG. 5(3), by constituting the roof 2 of the treating chamber in a shape of a louver as shown by notation 2a, vapor separated from salt component flows out from a number of gaps of the louver-like roof 2a smoothly into the spaces 23a and 23b.

Further, by divergingly inclining the side walls 5a and 5b on the lower side of the curved faces 29, sea water which has flowed down from the outer roof 4 is firmly brought into contact with the side walls 5a and 5b by which evaporation of water component is expedited and the salt concentration of sea water is increased.

Although according to the above-described embodiments, only one of the atomizing means 13 is installed on the side of the gable wall 6, a plurality of them may be installed and it may installed on the side of the gable wall 7 on the other side. Similarly, the heating chamber 25 may also be installed on the side of the gable wall 7 on the other side. Further, the atomizing means 13 can be installed on a wall portion other than the gable wall.

The atomizing means 13 is not necessarily installed only on the wall portion but when a spraying structure having a constitution capable of spraying in all direction of 360° is adopted, it can also be installed at the center of the treating chamber 1. In sum, it can pertinently be selected in accordance with capacity, structure and shape of the treating chamber. Further, other than the atomizing means 13 on the side of the heating chamber 25, an exclusive machine for blowing warm air of the heating chamber 25 to the treating chamber 1 can also be installed.

Figure 6:
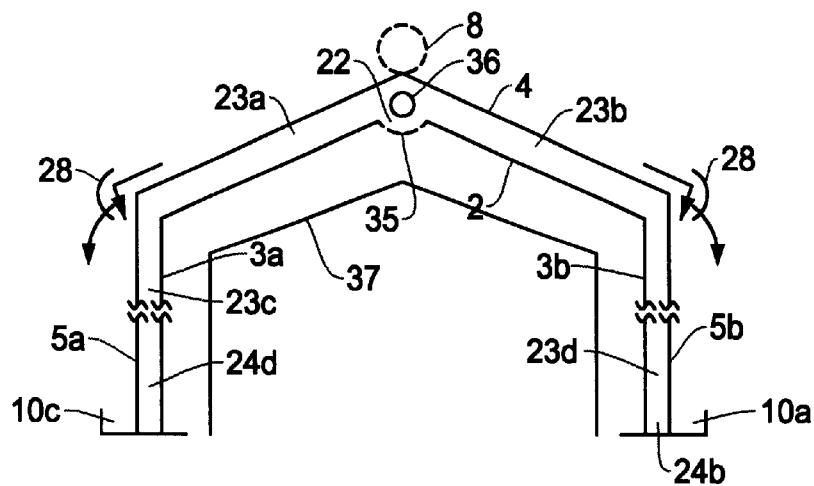
FIGS. 6(1), 6(2) and 6(3) are other embodiments of an inner constitution of a treating chamber.
Figure 6:
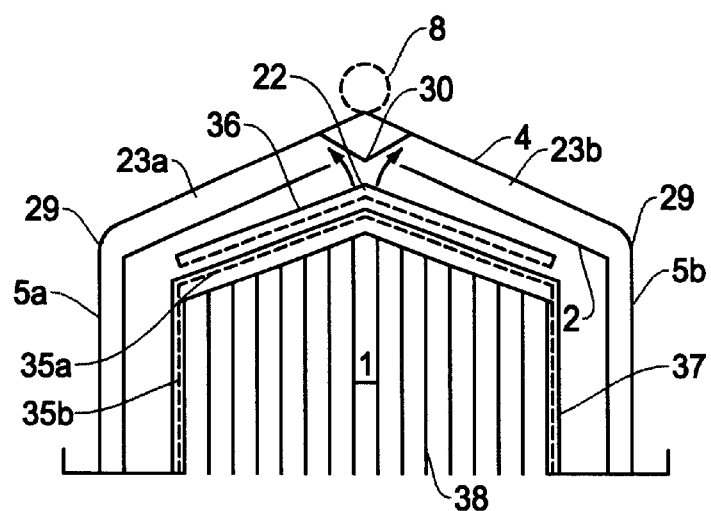
Figure 6:
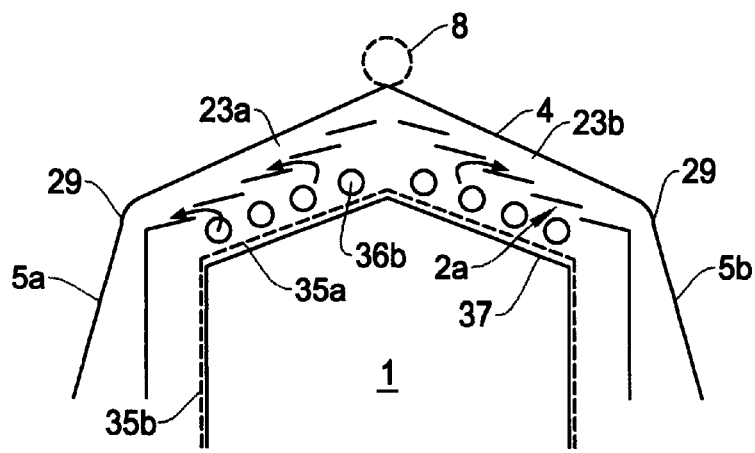
Figure 7:
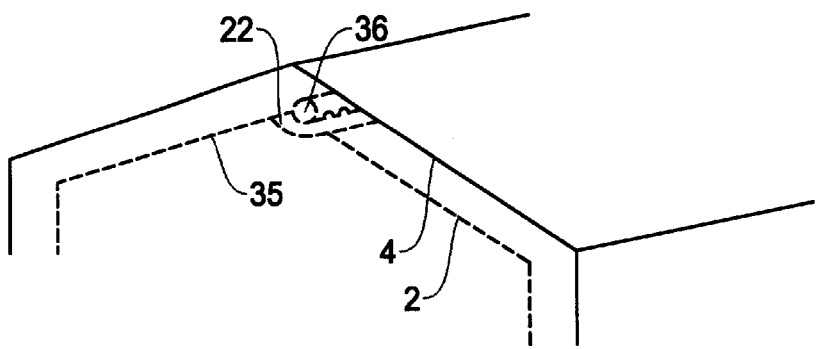
FIG. 7 is a perspective view of essential portions of the embodiment shown by FIG. 6(1)

FIGS. 6(1), 6(2) and 6(3) show other embodiments of inner constitutions of the treating chamber 1. Although in FIG. 6(1), a net (first screen) 35 in a recess shape is installed on the lower side of the duct hole 22 at the top end of the roof 2 of the treating chamber, the net 35 may be installed horizontally in the midst of the conduct hole 22. When the embodiment is viewed by a perspective view, it is as shown by FIG. 7.

According to the constitution, the net 35 is installed on the lower side of the duct hole 22 for exhausting vapor which is opened at the top end of the roof 2 in a shape of a gable roof of the treating chamber 1 and therefore, salt component separated from water component in the treating chamber or condensed sea water can be prevented from passing through the duct hole 22 without stopping.

In this way, salt component or condensed sea water is hampered by the net 35 and is adhered to the net 35 and a sprinkling pipe 36 of sea water is arranged such that salt component or condensed sea water adhered to the net 35 is washed off and dropped into the treating chamber 1. The sprinkling pipe 36 is provided with a structure in which a number of holes are perforated only on the lower side and sea water is sprinkled toward the net 35.

According to the structure of FIG. 6(2), on the lower side of the roof 2 of the treating chamber, a net 35a extended over a wide face is stretched and side nets 35b hang from vicinities of the both ends of the net 35a. The side nets 35b are arranged on the inner side of the side walls 3a and 3b.

Further, on the upper side of the net 35a of the ceiling side, a sprinkling pipe 36a of sea water is arranged in directions the same as those of slopes of the roof. It is preferable to install a number of the sprinkling pipes 36a in a direction orthogonal to paper face. A number of sprinkling holes are perforated on the lower side of each of the sprinkling pipes 36a and therefore, sea water can be sprayed on a wide region of the net 35a and salt component or condensed sea water adhered to the net 35a can be washed off. Although salt component or condensed sea water adhered to the side nets 35b can be washed off by sea water having high concentration which flows down from the net 35a on the ceiling side, sea water may be sprinkled from outer sides of the side nets 35b.

In the case of the structure having the duct hole 22 as in FIGS. 6(1) and 6(2), it is further effective to arrange the net 35 on the lower side or in the midst of the duct hole 22 as shown by FIG. 6(1) and arranging the nets 35a and 35b below the ceiling of the treating chamber 1 or inner sides of the side walls.

According to the constitution of FIG. 6(3), the net 35a on the ceiling side of the treating chamber and the side nets 35b on the inner sides of the side walls 3a and 3b are installed, sprinkling pipes of sea water are arranged in a direction orthogonal to paper face as designated by notation 36b. Further, a plurality of them are arranged at intervals in directions the same as slopes of the roof.

In the case in which water is sprinkled on the wide nets 35a and 35b from the sprinkling pipes 36a and 36b as shown by FIG. 6(2) and FIG. 6(3), when a structure moving the sprinkling pipes 36a and 36b in a direction substantially in parallel with the nets 35a and 35b is constituted, a number of the sprinkling pipes 36a and 36b can be reduced.

Although the nets (first screens) 35, 35a and 35b for hampering salt component or condensed sea water from passing therethrough are provided with, for example, a mesh of about 1 mm, the invention is not limited thereto. Further, when a plurality of nets overlap as mentioned above, the mesh is made finer. Although an explanation has been given of a method of washing off salt component or condensed sea water adhered to the nets (first screens) 35, 35a and 35b by sprinkling sea water in order to recover it by dropping it, it may be dropped by other method such as applying vibration.

In FIGS. 6(1), 6(2) and 6(3), numeral 37 designates cloth (second screen) which may be arranged on the upper side and the outer side of the wide nets 35a and 35b as shown by FIG. 6(2) or may be arranged on the lower side and the inner side of the nets 35a and 35b as shown by FIG. 6(3). Further, as shown by FIG. 6(1), only the cloth (second screen) 37 may be stretched without using the nets 35a and 35b or the cloth 37 may be stretched doubly or triply by overlapping it or at intervals. Further, arbitrary supporting means can naturally be utilized such that the cloth is not hung. The mesh size of the cloth (second screen) is smaller than the mesh size of the net (first screen).

Although in the case of the net, spaces of meshes are provided and therefore, it is suitable to use by overlapping it as mentioned above, in the case of the cloth, there are no spaces of gaps and therefore salt component can effectively be prevented from passing therethrough without stopping. Therefore, it is suitable to use the cloth per se or along with the net.

Numeral 38 designates a string and when a number of them are made to hang by utilizing arbitrary supporting means in the treating chamber 1, salt component is firstly adhered onto the number of strings 38 and the crystallization is expedited. When they are knocked or shaken after being adhered with a large amount of salt crystal, crystal of salt can easily be recovered. Further, the cloth 37 may be constituted by woven or nonwoven cloth and material of the cloth 37 or the string 38 is arbitrary.

When various conditions for crystallizing salt component cannot securely be controlled or even when they can sufficiently be controlled, in the case in which the roof of the treating chamber is low, there is a concern in which salt component is exhausted along with water component or condensed sea water in a state in which it is not effectively separated from water component is exhausted along with water vapor and as a result, the yield of salt production is lowered. However, when the nets (first screen) 35, 35a and 35b or the cloth (second screen) 37 or the strings 38 are used, salt crystal can be provided further effectively and separated fresh water constitutes fresh water having small salt component and higher purity.

In the case in which sea water is treated as mentioned above, when separation and evaporation of water component is carried out effectively and reliably, salt crystal piles up in the treating chamber. Further, when salt is collected and added with water, the bittern component is separated and salt crystal remains.

However, when the conditions are not pertinent, salt crystal may not be provided but condensed sea water including salt crystal may be constituted. In such a case, when condensed sea water including salt stored in the treating chamber 1 is collected and condensed, only salt crystal is provided.

According to the method and the apparatus mentioned above, when condensed sea water having a sufficient concentration or condensed sea water including salt cannot be provided by carrying out atomization of sea water and evaporation of water component only once, it can be gradually condensed by circulating at plural times as in supplying condensed sea water stored in the treating chamber 1 again to the atomizing means 13 to scatter.

Industrial Applicability

According to the first aspect of the invention, when sea water is atomized, innumerable small particles of sea water are produced and accordingly, the surface area in contrast to the volume is increased and vaporization of the water component is facilitated. As a result, separation of the water component from crystals of the salt component can efficiently be carried out. Further, the warm air is blown thereto and accordingly, vaporization of the water component can further be expedited by thermal energy and wind and natural salt can inexpensively be produced.

Particularly, between the treating chamber and the outflow portion of the evaporating water component there is arranged at least one of net (first screen) and cloth (second screen) is arranged in one stage or a plurality of stages and accordingly, when the evaporated component passes through at least one of the net and the cloth, the salt component is prevented from passing therethrough and is adhered to at least one of the net and the cloth. Here, the phrase of "at least one of net and cloth" is used to mean either (1) net, (2) cloth, or (3) net and cloth. As noted above, the cloth (second screen) has a mesh size smaller than that of the net (first screen).

As a result, it is possible to prevent the salt component separated from the water component and the condensed sea water from being discharged wastefully. Further, the salt component and the condensed sea water are hampered by at least one of the net and the cloth to suppress discharges therefrom. Therefore, an amount of the salt component contained in the discharged water component is reduced and accordingly, water obtained becomes more resembled to fresh water.

And, since the salt component adhered to the net and the cloth is peeled and dropped therefrom, only the salt component is efficiently recovered and mass-production of salt becomes possible.

According to the second aspect, according to the method wherein at least one of the net and the cloth is made to hang also on a side portion of the treating chamber and the salt component is adhered thereto, also the salt component floating in the vicinity of a side wall of the treating chamber is adhered to the net and the cloth, so that salt is produced more efficiently by peeling and dropping the adhered salt component.

According to the third aspect of the invention, when a number of strings are made to hang below the net or the cloth for preventing the salt component from passing therethrough and salt component is adhered thereto, crystals of the salt component can be provided before reaching the net or the cloth and by knocking, shaking the number of strings or knocking or shaking them by collecting them at one place, the salt component can easily be collected to one place.

According to the fourth aspect of the invention, when the salt component or the condensed sea water adhered to the net or the cloth by being prevented from passing therethrough, can be recovered at inside of the treating chamber by washing off or shaking off it by spraying sea water and accordingly, the salt component or the condensed sea water separated from the water component after all the procedure can be recovered to utilize in salt production and the salt production can be carried out efficiently.

According to the fifth aspect of the invention, according to the method wherein fine mists are generated by a centrifugal force obtained by means of rotating an impeller in which arcuate blades are radially provided in a space between two circular disks and which as a water injection port at its center, the sea water becomes very fine particles and moreover a large amount of sea water can be made into fine particles, so that salt and fresh water can be produced in large amount.

According to the sixth aspect of the invention, by adopting a method in which sea water is scattered and warm wind is blown thereto in the space of the treating chamber and evaporated water component is discharged outside of the treating chamber, large amounts of fresh water and natural salt can be separated from each other and therefore, mass production of natural salt and fresh water can be carried out further easily. As a result, natural salt and fresh water can inexpensively be produced.

According to the seventh aspect of the invention, in making fine and scattering sea water, thermal energy is applied by preheating sea water, as a result, vaporization of sea water and crystallization of natural salt are further expedited. In this case, sea water is heated at a temperature to a degree by which components in sea water are not altered and accordingly, quality of natural salt is not deteriorated.

According to the eighth aspect of the invention, one stage or plural stages of at least one of the net and the cloth for preventing the salt component from escaping are arranged between the treating chamber and the outflow portion for the evaporated water component and accordingly, in carrying out salt production by treating sea water, the salt component or the condensed sea water is hampered by the net or the cloth and the discharge is restrained and accordingly, only the water component passes through the net or the cloth and is discharged.

And, there is provided means for peeling and dropping the salt component adhered to the net and the cloth and accordingly, the salt component and the condensed sea water can be separated more effectively from the water component to produce salt in mass-production basis, and the water component can be utilized as flesh water.

According to the ninth aspect, owing to the constitution in which a number of strings are made to hang below the net or the cloth for preventing the salt component from passing therethrough, floating salt component adheres to the number of strings before the salt component reaches the net or the cloth and accordingly, recovery of the salt component is easy which is suitable for mass production.

According to the tenth aspect of the invention, owing to the structure in which the salt component or the condensed sea water adhered to the net or the cloth is washed off by spraying sea water on the net or the cloth, the salt component or the condensed sea water adhered to the net or the cloth can be recovered to use for salt production. As a result, the salt component or the condensed sea water can be prevented from being discharged wastefully and the yield of salt production is promoted.

According to the eleventh aspect of the invention, owing to the means for atomizing and scattering sea water in the treating chamber, sea water can be atomized in the treating chamber and can be scattered in a wide space to facilitate vaporization of the water component. Further, owing to the warm wind blowing means, thermal energy and wind can be provided to small particles of sea water. Vaporized vapor rises owing to the light specific weight and a duct hole for discharge is opened at the roof portion of the treating chamber and accordingly, only water component can be smoothly discharged from the treating chamber and can be separated from crystals of natural salt.

Further, the net is provided so as to cover the duct of the roof portion for discharging the water vapor vaporized in the treating chamber, and means for peeling and dropping the salt component adhered to the net is provided and accordingly, it is possible to peel and drop the salt component adhered to the net and the condensed sea water by such means as washing off with the sea water, so that it is suitable for efficiently producing salt in mass-production basis.

According to the twelfth aspect of the invention, owing to the constitution in which the net or the cloth for adhering the salt component is arranged in a midway or on a lower side of a duct hole opened between the inside of the treating chamber and the outside of the treating chamber, even the net or the cloth having a comparatively small area is sufficient and means for washing off the salt component or the condensed sea water adhered to the net or the cloth is sufficient with a small scale. Further, all of the salt component or the condensed sea water discharged from the inside of the treating chamber to the outside passes through the duct hole and accordingly, the salt component or the condensed sea water can be recovered efficiently.

According to the thirteenth aspect of the invention, sea water is scattered on the outer roof, the water component is evaporated by solar ray and wind, the concentration of the salt component is increased and thereafter, sea water is supplied to the atomizing means, very fine mist of sea water is produced in the treating chamber and accordingly, separation of the water component from the salt component can efficiently be carried out. Further, by scattering sea water on the outer roof and cooling a space between the outer roof and the roof of the treating chamber, vapor which has been vaporized in the treating chamber and flowed into the space is cooled and liquefied and accordingly, the space constitutes negative pressure. As a result, an effect of smoothly sucking vapor in the treating chamber into the space can also be achieved.

Further, when vapor is cooled and liquefied into liquid in this way, thermal energy absorbed in the treating chamber as vaporization heat is discharged as liquefaction heat. The discharged heat can expedite condensation by warming sea water scattered on the outer roof and can contribute to vaporization of small particles of sea water by being transferred also into the treating chamber.

According to the fourteenth aspect of the invention, owing to the constitution in which the net or the cloth for adhering the salt component is arranged on the lower side of the inner roof of the treating chamber or on the inside of the side wall, the net or the cloth can be stretched in a wide region, the salt component or the condensed sea water is caught in a wide area and accordingly, the efficiency of recovering the salt component or the condensed sea water is increased.

According to the fifteenth aspect of the invention, owing to the constitution in which a number of strings are made to hang under the net or the cloth for preventing the salt component from passing therethrough at inside of the treating chamber, the salt component adhered to the number of strings before reaching the net or the cloth and accordingly, the salt component adhered to the strings can be shaken off and the recovery of the salt component is facilitated which is suitable for mass production.

According to the sixteenth aspect of the invention, owing to the constitution in which sea water is scattered from the upper side of the net on the lower side of the inner roof and the salt component is washed off and accordingly, a large amount of the salt component or the condensed sea water adhered to the net or the cloth in a wide region can efficiently be recovered and can be utilized in salt production.

According to the seventeenth aspect of the invention, before supplying sea water to the atomizing means, the preheating unit of sea water is provided, sea water accompanied by thermal energy is supplied to the atomizing means and therefore, vaporization of water component of fine mist of sea water is further expedited.

According to the eighteenth aspect of the invention, the heating chamber is installed at a distance from the side wall of the treating chamber, warm air in the heating chamber is blown to the inside of the treating chamber and therefore, a large amount of thermal energy can be provided to very fine mist of sea water in the treating chamber and vaporization of the water component is further expedited. Further, the preheating unit of sea water in accordance with the seventeenth aspect of the invention is provided in the heating chamber and extra heat produced from the preheating unit of sea water is utilized and accordingly, the constitution is economical.

According to the nineteenth aspect of the invention, owing to the constitution in which warm air produced in the heating facility can be supplied into the treating chamber, even when solar energy cannot be utilized as in, for example, rainy weather, thermal energy is provided to very small particles of sea water in the treating chamber and the water component and the salt component can smoothly be separated from each other.

According to the twentieth aspect of the invention, owing to the water distributing structure capable of supplying sea water to the preheating unit without via the outer roof, when the processing of condensing sea water by natural energy cannot be carried out on the outer roof due to rainy weather, sea water is supplied as it is to the preheating unit, thermal energy is provided to sea water and sea water can be supplied to the treating chamber and accordingly, natural salt and fresh water can be produced without being controlled by weather.

According to the twenty-first aspect of the invention, owing to the structure in which sea water the salt component of which is condensed by being scattered on the outer roof is guided and scattered again onto the outer roof, the sea water can be condensed by natural energy on the outer roof over a plurality of times. Accordingly, the structure is suitable for the case of mass production of natural salt.

According to the twenty-second aspect of the invention, by constituting the outer roof and the roof of the treating chamber by transparent bodies, solar energy can reach the inside of the treating chamber to thereby heat it and accordingly, in fine weather, vaporization of fine mist of sea water in the treating chamber can efficiently be carried out.

What is claimed is:

1. A method of treating sea water or condensed sea water for producing salt, comprising the following steps of:

providing a treating chamber having a roof and side walls, atomizing sea water into the treating chamber by scattering the sea water with use of a centrifugal generator, evaporating water components of the atomized sea water by blowing warm wind to the atomized sea water, arranging a first screen in one stage or a plurality of stages for passing the evaporated water components therethrough, said first screen is positioned below an opening provided at the roof of the treating chamber for exhausting the evaporated water components, adhering salt components to the first screen when the water components atomized by the rotation of the centrifugal generator and evaporated by the warm wind move upwardly toward the opening and pass through the first screen, and removing the adhered salt components by peeling and dropping the salt components from the first screen.

2. The method of treating sea water according to claim 1, further comprising a step of arranging a second screen having a mesh size different from that of the first screen, and the salt components are adhered to the first screen and the second screen.

3. The method of treating sea water according to claim 2, wherein a plurality of strings are hung on a lower side of the second screen and the salt components are adhered to the plurality of strings.

4. The method of treating sea water according to claim 2, wherein the salt components adhered to the first screen or the second screen are recovered by washing off the salt components by sea water.

5. The method of treating sea water according to claim 1, wherein said step of atomizing the sea water by rotating the centrifugal generator includes a step of applying a centrifugal force to the sea water by using an impeller in which arcuate blades are radially provided in a space between two circular disks wherein a water injection port is provided at its center.

6. The method of treating sea water according to claim 1, wherein said step of atomizing the sea water includes a step of scattering the sea water into the treating chamber by rotating the centrifugal generator in which the warm wind is blown, whereby the evaporated water components are discharged to outside of the treating chamber through the opening, while crystallized salt components are stored in the treating chamber.

7. The method of treating sea water according to claim 1, wherein said step of atomizing the sea water includes a step of preheating the sea water, before scattering the sea water, to a degree by which components in the sea water are not altered.

8. An apparatus of treating sea water for producing salt comprising:

a treating chamber having a roof and side walls;

a centrifugal generator for atomizing sea water by scattering the sea water in the treating chamber by its rotation;

means for blowing warm air wind to the atomized sea water in the treating chamber to evaporate water components in the sea water thereby crystallizing the salt components;

a first screen formed in one stage or a plurality of stages for passing the evaporated water components therethrough, said first screen is below an opening provided at the roof of the treating chamber for exhausting the evaporated water components, wherein the crystallized salt components adhere to the first screen; and means for peeling and dropping the salt components adhered to the first screen.

9. The apparatus of treating sea water according to claim 8, further comprising a second screen having a mesh size different from that of the first screen; said second screen being positioned within said treating chamber in such a way the evaporated water components pass through the second screen before pass through the first screen; wherein a plurality of strings are hung on a lower side of the second screen for adhering the salt components to the strings.

10. The apparatus of treating sea water according to claim 9, further comprising means for washing off the salt components by spraying the sea water on the first screen and the second screen, wherein the washing off means is arranged above the first screen and the second screen.

11. An apparatus of treating sea water comprising:

a treating chamber having a roof and side walls;

means for atomizing sea water by rotating a centrifugal generator and scattering the sea water into the treating chamber;

means for blowing warm wind to mist of the atomized sea water in the treating chamber to vaporize the atomized sea water and thereby crystallizing the salt components;

a duct hole provided in the roof of the treating chamber for exhausting the vaporized water in the treating chamber to outside of the treating chamber;

at least one stage of a net for covering the duct hole, wherein the crystallized salt components adhere to the net; and means for peeling and dropping the salt component adhered to the net.

12. The apparatus of treating sea water according to claim 11, further comprising:

at least one stage of a cloth for adhering salt components which is arranged at a midway or on a lower side of the duct hole, said cloth having a mesh size smaller than that of the net; and means for washing off the salt components by scattering the sea water to the net and the cloth, said washing off means being arranged on an upper side of the net and the cloth.

13. The apparatus of treating sea water according to claim 11, further comprising:

an outer roof provided above the roof of the treating chamber;

outer walls provided at outside of the side walls of the treating chamber where the outer walls are continuous with the outer roof;

means for scattering the sea water over the outer roof, said scattering means is above the outer roof thereby flowing the sea water on the outer roof and the outer walls; and a water distributing structure for supplying a portion of the sea water recovered from the outer roof and the outer walls to the atomizing means.

14. The apparatus of treating sea water according to claim 12, wherein at least one stage of the net or cloth for adhering the salt components is arranged below the roof of the treating chamber or inner sides of the side walls of the treating chamber.

15. The apparatus of treating sea water according to claim 14, wherein a plurality of strings are hung from a lower side of the net or cloth for adhering the salt components thereto.

16. The apparatus of treating sea water according to claim 14, further comprising means for washing off the salt components by scattering the sea water to the net and the cloth wherein the washing means is arranged between an upper side of the net and the cloth and a lower side of the roof portion of the treating chamber.

17. The apparatus of treating sea water according to claim 11, further comprising:

a preheating unit for heating the sea water before being supplied to the atomizing means to a degree by which components in the sea water are not altered.

18. The apparatus of treating sea water according to claim 11, further comprising:

a heating chamber installed at a distance from one of the side walls of the treating chamber for producing heated air; and sea water preheating means installed in the heating chamber for heating the sea water;

wherein the heated air in the heating chamber is blown into the treating chamber by the blowing means from an opening established at said side wall of the treating chamber.

19. The apparatus of treating sea water according to claim 11, further comprising:

a heating means for producing the warm air and supplying the warm air into the treating chamber.

20. The apparatus of treating sea water according to claim 13, wherein said water distributing structure supplies the sea water to a preheating unit without flowing on the outer roof for heating the sea water before being scattered by the atomizing means.

21. The apparatus of treating sea water according to claim 13, wherein said water distributing structure further comprising a sea water tank to store a portion of the sea water recovered from the outer roof and a means for guiding and scattering the recovered sea water from the sea water tank back again on the outer roof.

22. The apparatus of treating sea water according to claim 13, wherein at least a portion of the roof of the treating chamber and the outer roof are comprised of transparent material.

* * * * *